No. 763,023. PATENTED JUNE 21, 1904.
R. C. SAYER.
SEAM STRUCTURE.
APPLICATION FILED JUNE 27, 1902.
NO MODEL.
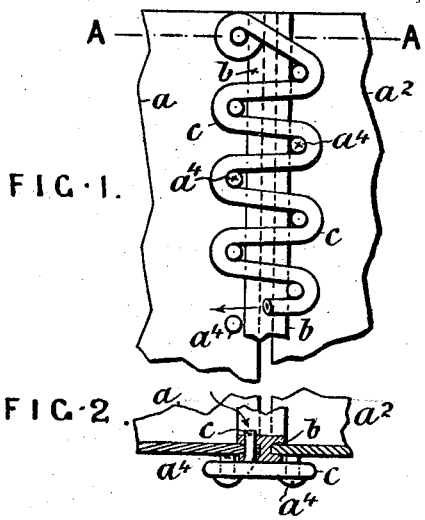
WITNESSES.
Albert Jones
Samuel Percival
INVENTOR
Robert Cooke Sayer
By his Attorneys
Wheatley & MacKenzie No. 763,023. Patented June 21, 1904.

UNITED STATES PATENT OFFICE.

ROBERT COOKE SAYER, OF BRISTOL, ENGLAND.

SEAM STRUCTURE.

SPECIFICATION forming part of Letters Patent No. 763,023, dated June 21, 1904.

Application filed June 27, 1902. Serial No. 113,537. (No model.)

*To all whom it may concern:*

Be it known that I, ROBERT COOKE SAYER, engineer, a subject of the King of Great Britain and Ireland, residing at 11 Clyde road, Redland, Bristol, England, have invented certain new and useful Improvements in Seam Structures; and I do hereby declare the following to be a full, clear, and exact description of the invention, such as will enable others skilled in the art to which it appertains to make and use the same.

This invention for improvements in the construction of shapes, molds, or vessels for taking fluids, fluid-pressures, or other strains has for its object to form a vessel of any shape in two or more parts and to so connect and hold the parts together that their joints shall be able to take the necessary strains and the vessel to retain fluid or pressure; and it consists in drawing the parts together by the contracting effort of material that is elastic when hot or cold.

The invention is hereinafter described with reference to the accompanying drawings, in which—

Figure 1 is in part an elevation of a vessel or structure constructed according to the invention, having its contracting coils restricted to the joints. Fig. 2 is a section at A A, Fig. 1.

The structure illustrated is made up of parts $a$ and $a^2$, connected by a joint-piece or packing $b$, formed suitably for making the joints tight when the parts are drawn together. A heated helical coil formed of a rod, pipe, or tube $c$ is wound round lugs $a^4$, arranged on opposite sides of the joint, which on cooling contracts and draws the parts $a$, $a^2$, and $b$ together, or they are similarly drawn together by the coils $c$ when made of material that is elastic when cold, and are applicable for pipes or connecting framework, or for high-pressure vessels for steam generation, or atmospheric pressure.

The grip of the coil $c$ when tubular or hollow is increased by causing a fluid cooler than that in the vessel itself, as shown by arrowheads, to pass into or through the coils $c$. The fluid is supplied either by the vessel itself from a part most remote from the means of heating or from an external source.

What I claim, and desire to secure by Letters Patent, is—

1. A structure, comprising two or more parts, a connecting joint-piece or packing between the parts, and a contractile helix wound on the parts and adapted by its contracting effort to force them together and tightly close the joint substantially as described.

2. A structure comprising two or more parts, a joint-piece or packing between the parts, a rod or pipe helically wound round the parts and capable of drawing the parts together by the contracting effort exerted substantially as described.

3. A structure comprising two or more parts, a connecting joint-piece or packing between the parts, a pipe helically wound round the parts of the structure and containing fluid-pressure and adapted to draw the parts together by the contracting effort exerted by the helix and the fluid contained therein substantially as described.

In testimony whereof I have affixed my signature in presence of two witnesses.

ROBERT COOKE SAYER.

Witnesses:
LIONEL A. WILSON,
GILBERT J RICKETTS.